United States Patent
Wang et al.

(10) Patent No.: US 12,223,268 B2
(45) Date of Patent: Feb. 11, 2025

(54) METHOD AND APPARATUS FOR EVENT EXTRACTION AND EXTRACTION MODEL TRAINING, DEVICE AND MEDIUM

(71) Applicant: BOE TECHNOLOGY GROUP CO., LTD., Beijing (CN)

(72) Inventors: Bingqian Wang, Beijing (CN); Shaoxun Su, Beijing (CN); Tianxin Liang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 512 days.

(21) Appl. No.: 17/419,836

(22) PCT Filed: Sep. 28, 2020

(86) PCT No.: PCT/CN2020/118374
§ 371 (c)(1),
(2) Date: Jun. 30, 2021

(87) PCT Pub. No.: WO2022/061877
PCT Pub. Date: Mar. 31, 2022

(65) Prior Publication Data
US 2022/0318506 A1 Oct. 6, 2022

(51) Int. Cl.
*G06F 40/284* (2020.01)
*G06F 40/126* (2020.01)
*G06F 40/30* (2020.01)

(52) U.S. Cl.
CPC .......... *G06F 40/284* (2020.01); *G06F 40/126* (2020.01); *G06F 40/30* (2020.01)

(58) Field of Classification Search
CPC .... G06F 40/211; G06F 40/216; G06F 40/279; G06F 40/284; G06F 40/289;
(Continued)

(56) References Cited

U.S. PATENT DOCUMENTS

2017/0357716 A1* 12/2017 Bellegarda ............ G06F 16/345

FOREIGN PATENT DOCUMENTS

| CN | 108334492 A | 7/2018 |
| CN | 109918658 A | 6/2019 |

(Continued)

OTHER PUBLICATIONS

Yang, et al. "Exploring Pre-trained Language Models for Event Extraction and Generation", National University of Defense Technology, Changsha, China, 2019.
(Continued)

*Primary Examiner* — Leshui Zhang
(74) *Attorney, Agent, or Firm* — HOUTTEMAN LAW LLC (57) ABSTRACT

A method for event extraction according to the disclosure includes: processing an object text using a preset extraction model to determine event information of the object text; wherein the event information includes an event element, and an event type and a role corresponding to the event element; and the extraction model includes a classification layer and an output layer; the classification layer is configured to determine a token attribute of a token in the object text; the token attribute includes whether the token is a start token of the event element of any event type and any role, and whether the token is an end token of the event element of any event type and any role; and the output layer is configured to determine the event element according to the token attribute of the token, and determine the event type and the role corresponding to the event element.

18 Claims, 5 Drawing Sheets

(58) Field of Classification Search
CPC ...... G06F 40/295; G06F 40/126; G06F 40/30; G06F 40/35; G06F 16/35; G06F 16/3344; G06F 16/353; G06F 16/3329; G06F 16/367; G06F 16/313; G06F 16/355
USPC .................................................. 704/1–5, 7–9
See application file for complete search history.

(56) References Cited

FOREIGN PATENT DOCUMENTS

| | | | |
|---|---|---|---|
| CN | 110188172 A | | 8/2019 |
| CN | 111159336 A | | 5/2020 |
| CN | 111177326 A | | 5/2020 |
| CN | 111222318 A | | 6/2020 |
| CN | 111241832 A | | 6/2020 |
| CN | 111368551 A | * | 7/2020 |
| CN | 111382575 A | | 7/2020 |
| CN | 111428504 A | | 7/2020 |

OTHER PUBLICATIONS

Zhao, et al., "Research on Chinese Event Extraction and the English translation thereof", Journal of Chinese Information Processing, vol. 22, No. 1, Jan. 2008.

* cited by examiner

| | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Competition behavior - win or lose, winner | Start | 0 | 0 | 0 | 0 | 0 | 0 | 1 | 0 | 0 | 0 | 0 | 0 | 0 | 0 | 0 | 0 | 0 |
| | End | 0 | 0 | 0 | 0 | 0 | 0 | 0 | 0 | 1 | 0 | 0 | 0 | 0 | 0 | 0 | 0 | 0 |
| Competition behavior - win or lose, loser | Start | 0 | 0 | 0 | 0 | 0 | 0 | 0 | 0 | 0 | 0 | 0 | 1 | 0 | 0 | 0 | 0 | 0 |
| | End | 0 | 0 | 0 | 0 | 0 | 0 | 0 | 0 | 0 | 0 | 0 | 0 | 0 | 1 | 0 | 0 | 0 |
| Competition behavior - win or lose, time | Start | 0 | 0 | 0 | 0 | 0 | 0 | 0 | 0 | 0 | 0 | 0 | 0 | 0 | 0 | 0 | 0 | 0 |
| | End | 0 | 0 | 0 | 0 | 0 | 0 | 0 | 0 | 0 | 0 | 0 | 0 | 0 | 0 | 0 | 0 | 0 |
| Competition behavior – promote, time | Start | 0 | 0 | 0 | 0 | 0 | 0 | 0 | 0 | 0 | 0 | 0 | 0 | 0 | 0 | 0 | 0 | 0 |
| | End | 0 | 0 | 0 | 0 | 0 | 0 | 0 | 0 | 0 | 0 | 0 | 0 | 0 | 0 | 0 | 0 | 0 |
| Competition behavior – promote, promoter | Start | 0 | 0 | 0 | 0 | 0 | 0 | 1 | 0 | 0 | 0 | 0 | 0 | 0 | 0 | 0 | 0 | 0 |
| | End | 0 | 0 | 0 | 0 | 0 | 0 | 0 | 0 | 1 | 0 | 0 | 0 | 0 | 0 | 0 | 0 | 0 |
| Competition behavior – promote, competition | Start | 0 | 0 | 0 | 0 | 0 | 0 | 0 | 0 | 0 | 0 | 0 | 0 | 0 | 0 | 1 | 0 | 0 |
| | End | 0 | 0 | 0 | 0 | 0 | 0 | 0 | 0 | 0 | 0 | 0 | 0 | 0 | 0 | 0 | 0 | 1 |
| Object text | | A | 球 | 员 | 绝 | 杀 | , | B | 球 | 队 | 战 | 胜 | C | 球 | 队 | 晋 | 级 | 决 | 赛 |

METHOD AND APPARATUS FOR EVENT EXTRACTION AND EXTRACTION MODEL TRAINING, DEVICE AND MEDIUM

FIELD OF THE INVENTION

Embodiments of the disclosure relate to the technical field of artificial intelligence, and in particular relates to a method and apparatus for event extraction and extraction model training, an electronic device and a computer-readable medium.

BACKGROUND

Event extraction (EE) is a technology for determining an "event" described in a text based on a natural language from the text, and determining information related to the event. Event extraction has important applications in the fields of intelligent risk control, intelligent investment and research, public opinion monitoring, event mapping and the like.

However, the event extraction technologies in the prior art have not reached an ideal extraction effect.

SUMMARY

Embodiments of the present disclosure provide a method and apparatus for event extraction and extraction model training, an electronic device and a computer-readable medium.

In a first aspect, an embodiment of the present disclosure provides a method for event extraction, including:
  processing an object text using a preset extraction model to determine event information of the object text;
  wherein the event information includes an event element, and an event type and a role corresponding to the event element; and the extraction model includes a classification layer and an output layer;
  the classification layer is configured to determine a token attribute of a token in the object text; the token attribute includes whether the token is a start token of the event element of any event type and any role, and whether the token is an end token of the event element of any event type and any role; and
  the output layer is configured to determine the event element according to the token attribute of the token, and determine the event type and the role corresponding to the event element.

In some embodiments, the extraction model further includes an encoding layer; and
  the encoding layer is configured to encode the object text and input an encoded result to the classification layer.

In some embodiments, the encoding layer includes a bidirectional encoder representation from transformer (BERT) sub-layer.

In some embodiments, the encoding layer further includes a postag embedding sublayer; and an output of the postag embedding sublayer and an output of the BERT sublayer are concatenated into the encoded result.

In some embodiments, the encoding layer further includes a bi-long short term memory (BILSTM) sublayer, after passing which an output of the BERT sublayer becomes the encoded result.

In some embodiments, the classification layer includes a start dichotomous-class net, an end dichotomous-class net, and a plurality of label dichotomous-class nets;
  wherein the start dichotomous-class net is configured to determine whether a token in the object text is the start token of the event element; the end dichotomous-class net is configured to determine whether the token in the object text is the end token of the event element; each of the label dichotomous-class nets corresponds to a preset label and is configured to determine whether the token in the object text conforms to the preset label, wherein the preset label includes a preset event type and a preset role, and at least one of the preset event type and the preset role in preset labels corresponding to any two different label dichotomous-class nets is different; and
  determining the event element according to the token attribute of the token and determining the event type and the role corresponding to the event element includes: determining the event element according to the start token and the end token, determining the preset label corresponding to the event element according to preset labels of at least part of the tokens of the event element, and determining the preset event type and the preset role of the event element corresponding to the preset label.

In some embodiments, determining whether the token in the object text is a start token of an event element includes: determining whether each token in the object text is a start token of an event element one by one; and
  determining whether a token in the object text is an end token of an event element includes: determining whether each token in the object text is an end token of an event element one by one.

In some embodiments, determining the event element according to the start token and the end token includes: determining the start token and the end token closest to each other as a group, and determining tokens between the start token and the end token in the same group as one event element.

In some embodiments, determining whether the token in the object text conforms to the preset label includes:
  determining only whether each start token and each end token in the object text conform to the preset label.

In some embodiments, determining the preset label corresponding to the event element according to the preset labels of at least part of the tokens of the event element includes:
  determining the preset label to which both of the start token and the end token the an event element conform as the preset label of the event element.

In some embodiments, the extraction model further includes an event extraction layer; the event extraction layer is configured to determine a type probability of each event type; the type probability of the event type represents the correlation between the object text and the event type;
  determining the token attribute of the token in the object text includes:
  determining an initial probability that the token in the object text is the start token of the event element of one event type and one role; and determining, according to the initial probability and the type probability of the event type, whether the token is the start token of the event element of the event type and the role; and
  determining an initial probability that the token in the object text is the end token of the event element of one event type and one role; and determining, according to the initial probability and the type probability of the event type, whether the token is the end token of the event element of the event type and the role.

In some embodiments, determining the token attribute of the token in the object text includes:

independently determining, for each token in the object text, whether the token is the start token of the event element of any event type and any role, and whether the token is the end token of the event element of any event type and any role, respectively.

In some embodiments, determining the event type and the role corresponding to the event element includes:

determining, in response to the condition that a plurality of event elements correspond to the same event type and the same role and based on a confidence degree of each of the event elements corresponding to the event type and the role, that the event element with the highest confidence degree corresponds to the event type and the role.

In a second aspect, an embodiment of the present disclosure provides a method for extraction model training, including:

determining an initial model;

training the initial model with a plurality of training samples to obtain an extraction model;

wherein the extraction model is configured to process an object text to determine event information of the object text; wherein the event information includes an event element, and an event type and a role corresponding to the event element; and the extraction model includes a classification layer and an output layer; the classification layer is configured to determine a token attribute of a token in the object text; the token attribute includes whether the token is a start token of the event element of any event type and any role, and whether the token is an end token of the event element of any event type and any role; and the output layer is configured to determine the event element according to the token attribute of the token, and determine the event type and the role corresponding to the event element.

In some embodiments, training the initial model with the plurality of training samples to obtain the extraction model includes:

performing adversarial training on the initial model with the plurality of training samples to obtain the extraction model.

In a third aspect, an embodiment of the present disclosure provides an electronic device, including:

one or more processor;

a memory having one or more computer program stored thereon:

one or more I/O interface connected between the processor and the memory and configured to enable information interaction between the processor and the memory; and the one or more computer program, when executed by the one or more processor, enables any one of the above methods for event extraction to be implemented.

In a fourth aspect, an embodiment of the present disclosure provides an electronic device, including:

one or more processor;

a memory having one or more computer program stored thereon:

one or more I/O interfaces connected between the processor and the memory and configured to enable information interaction between the processor and the memory; and the one or more computer program, when executed by the one or more processor, enables any one of the above methods for extraction model training to be implemented.

In a fifth aspect, an embodiment of the present disclosure provides a computer-readable medium having a computer program stored thereon which, when executed by a processor, enables any one of the above methods for event extraction to be implemented.

In a sixth aspect, an embodiment of the present disclosure provides a computer-readable medium having a computer program stored thereon which, when executed by a processor, enables any one of the above methods for extraction model training to be implemented.

BRIEF DESCRIPTION OF THE DRAWINGS

Accompanying drawings are provided for further understanding of the embodiments of the disclosure and constitute a part of the specification. Hereinafter, these drawings are intended to explain the disclosure together with the following embodiments, but should not be considered as a limitation to the disclosure. The above and other features and advantages will become more apparent to those skilled in the art through detailed description of the exemplary embodiments with reference to the accompanying drawings, in which.

DETAILED DESCRIPTION OF THE EMBODIMENTS

For better understanding the technical solutions in the embodiments of the present disclosure for those skilled in the art, the method and apparatus for event extraction and extraction model training, the electronic device, and the computer-readable medium according to the embodiments of the disclosure will be described below in detail in conjunction with the accompanying drawings.

Embodiments of the present disclosure will be described more sufficiently below with reference to the accompanying drawings. But the embodiments may be embodied in different forms and the disclosure should not be construed as limited to the embodiments set forth herein. Rather, these embodiments are provided so that this disclosure will be thorough and complete, and will fully convey the scope of the disclosure to those skilled in the art.

Embodiments described in the disclosure may be described with reference to plan and/or cross-sectional views in idealized representations of the present disclosure. Accordingly, the example illustrations may be modified in accordance with manufacturing techniques and/or tolerances.

Embodiments of the disclosure and features of the embodiments may be combined with each other if there is no conflict.

Terminology used in the disclosure is for the purpose of describing specific embodiments only and is not intended to limit the disclosure. As used in this disclosure, the term "and/or" includes any and all combinations of one or more of the associated listed items. As used in this disclosure, the singular forms "a", "an" and "the" are intended to include the plural forms as well, unless the context clearly indicates otherwise. As used herein, the terms "made of . . . " specifies the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used in the disclosure have the same meaning as commonly understood by one of ordinary skill in the art. It will be further understood that terms, such as those defined in commonly used dictionaries, should be interpreted as having a meaning that is consistent with their meaning in the context of the related art and the present disclosure, and will not be interpreted in an idealized or overly formal sense unless expressly so defined in the disclosure.

The embodiments of the present disclosure are not limited to the embodiments shown in the drawings, but include modifications of configurations formed based on a manufacturing process. Thus, the regions illustrated in the figures have schematic properties, and the shapes of the regions shown in the figures illustrate specific shapes of regions of elements, but are not intended to be limiting.

Explanation of Technical Terms

In the embodiments of the present disclosure, unless otherwise specified, the following technical terms should be understood in accordance with the following explanations:

An event, refers to a "thing" of a preset category, such as "a player A kills the game, and team B defeats team C and qualifies for the final (A球员绝杀，B球队战胜C球队晋级决赛)", "a meeting E of city D concludes at time F (D市E会议在F时间闭幕)", "country G establishes diplomatic relations with country H (G国家与H国家建立外交关系)", "company I launches product J (I公司宣布推出J产品)", and the like.

An event type is a "class" of the "category" to which the preset thing belongs. For example, the event type may include "competition behavior—win or loss", "competition behavior—promotion", "organization behavior—opening", "organization behavior—conclude", "war behavior—victory or defeat", "war behavior—starting", "war behavior—ending", so on and so forth.

It should be understood that some of the above event types have overlapping meanings, but they still belong to different event types. For example, "competition behavior—win or loss" and "competition behavior—promotion" are both related to competitions, but belong to two different event types, because win or loss in a competition does not necessarily result in a promotion (e.g., a competition involving only one round), while a promotion does not necessarily relate to win or loss (e.g., a draw at a group stage may also result in a promotion).

It should be understood that since the event type is preset, whether a "thing" is regarded as an "event" in the embodiments of the present disclosure, and what event type it belongs to, are related to a setting manner of the event type. For example, if event types such as "competition behavior—win or loss", "competition behavior—promotion" and the like are not preset, "a player A kills the game, and team B defeats team C and qualifies for the final" is generally regarded as a "thing" in reality, but is not regarded as an "event" in the embodiments of the present disclosure. For another example, the thing "a player A kills the game, and team B defeats team C and qualifies for the final" corresponds to only the event type "competition behavior—win or loss" if only the event type "competition behavior—win or loss" is preset, but corresponds to the event type "competition behavior—promotion" at the same time if the event type "competition behavior—promotion" is also preset.

An event element, also referred to as an "Argument" of an event, refers to a preset "element" associated with an event, which may be a "participant" (e.g., a subject, an object) of the event, or a word representing a property associated with the event (e.g., an adverb of the event). For example, the event element may include the above "player A," "team B," "team C," "city D," "time F," and so on.

A role, refers to preset related contents that may occur in different "positions" in an event, typically each role corresponds to an event element of the event, and each event element of the event has a certain role in the event. For example, the above "team B" plays a "winner" and/or "promoter" role in the event, "team C" plays a "loser" role in the event, "city D" plays a "location" role in the event, and "time F" plays a "time" role in the event.

It should be understood that a "role" is typically associated with an "event type", i.e., different event types correspond to different roles. For example, for the event type "competition behavior—win or loss", there may be a "winner" role, or a "loser" role, but no "promoter" role.

It should be understood that since the "roles" are preset, what event elements are involved in an event and what roles these event elements play, are both related to a setting manner of the roles. For example, for the event that "a player A kills the game, and team B defeats team C and qualifies for the final", when the event type is "competition behavior—win or loss", and only a "winner" role but no "loser" role is preset, "team B" is an event element and plays the "winner" role; while "team C" is no longer an event element (because there is no corresponding role).

It should be understood that, for each event, not all preset roles and corresponding event elements corresponding to the event type of the event necessarily exist at the same time. For example, if the event type "competition behavior—win or loss" is further preset with a "time" role, there is no event element corresponding to the "time" role in the event "a player A kills the game, and team B defeats team C and qualifies for the final".

Event extraction, refers to a process that processes a text of a natural language to determine an "event" described in the text, and determine an event type to which the event belongs, event elements to which the event relates, and event types and roles (or what role in what event type) corresponding to the respective event elements.

A dichotomous-class net, which is a kind of intelligent classification net, divides objects to be processed into one of two possible classes. That is, an object is neither considered to belong to the two classes at the same time, nor considered to belong to neither of the two classes.

The two classes corresponding to the dichotomous-class net are usually "mutually exclusive", that is, in the form of "meet a certain feature" or "not meet a certain feature", or in the form of "yes (e.g., represented by 1)" or "no (e.g., represented by 0)". Thus, a dichotomous-class net can generally calculate a probability that an object meets a feature (obviously, a sum of the probability of meeting the feature and the probability of not meeting the feature is 1), and determine whether the object "meets" the feature based on whether the probability of meeting the feature exceeds a preset value.

A "token", refers to the smallest independent unit into which a text (object text) can be divided according to a natural language. For example, a token may be a Chinese character, an Arabic numeral, an English/French/German/Russian/Arabic/Latin letter, a punctuation mark (e.g., a comma, a period, a question mark, a connector), etc.

DETAILED DESCRIPTION

In some related arts, the event extraction process may include four tasks, i.e., trigger word recognition, event type recognition, event element recognition, and role recognition.

Trigger word recognition refers to recognizing a "keyword" representing "an event" in the text, and the trigger word is usually a verb and usually has a certain relationship with an event type, such as win, promotion, concluding, or the like.

Event type recognition is a word-based multi-class task that judges the event type corresponding to each word in the text to determine the event type of the event in the text.

Event element recognition is a process of determining the event elements involved in the event of the text.

Role recognition is a "word pair" based multi-class task that forms "word pairs" from words (e.g., entities) corresponding to event elements in the text and words (e.g., trigger words) corresponding to event types, and determines a role of the event element in each "word pair" in the corresponding event type.

It can be seen that the above trigger word recognition and event type recognition correspond to determining "what event" is in the text, thus constituting the "event recognition task". The above event element recognition and role recognition correspond to determining the role of each event element in the event (of a specific event type), thus constituting the "role classification task".

In some related arts, event recognition may be performed using an extraction model in which the event recognition task and the role classification task are in a pipeline approach. Namely, the text is firstly subjected to the event recognition task to determine the event type, and then the event type is used as an input of the role classification task to further determine the event elements and the corresponding roles. However, in such extraction models, the event recognition task and the role classification task are disjoint from each other (or rather as two independent models). As a result, an error of the former will inevitably cause an error (cascade error) of the latter, while the latter cannot feed back to the former, finally resulting in a poor effect of event extraction.

In some related arts, event recognition may be further performed using an extraction model in which the event recognition task and the role classification task are in a joint approach. Namely, the event recognition task and the role classification task are correlated and can feed back to each other, thereby avoiding cascade errors. However, in such extraction models, since the interaction between the event recognition task and the role classification task is "two-way", a change in the former will cause a change in the latter, while the change of the latter in turn causes a change in the former. Such cycles make the two parts of the extraction model hard to reach an optimal state at the same time during training, resulting in an extended training process and poor effect of event extraction.

In addition, in the above related art, since the correspondence between the event element and the role is performed by the "word pair", some events with "overlapped event element" or "overlapped role" cannot be well handled.

For example, for the event that "a player A kills the game, and team B defeats team C and qualifies for the final", the event element "team B" is a "winner" role in the event type "competition behavior—win or lose", but also a "promoter" role in the event type "competition behavior—promotion", which case is called "overlapped role".

For another example, for the event "a meeting E of city D concludes at time F", an "activity name" role in the event type "organization behavior—conclude" corresponds to the event element "meeting E of city D", while the "location" role corresponds to the event element "city D". That is, event elements corresponding to different roles are partially overlapped, which case is called "overlapped event element".

In a first aspect, an embodiment of the present disclosure provides a method for event extraction.

Figure 1:
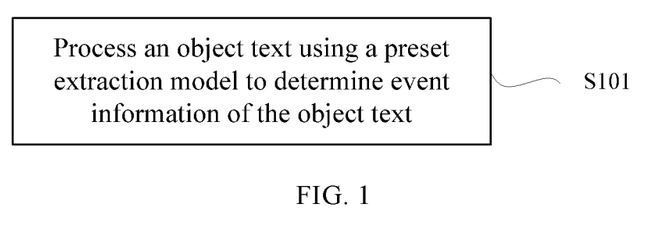
FIG. 1 is a flowchart of a method for event extraction according to an embodiment of the present disclosure.

Referring to FIG. 1, the method according to this embodiment of the present disclosure is configured to extract an event from a text of a natural language, and includes:

S101, processing an object text using a preset extraction model to determine event information of the object text.

The event information includes an event element, and an event type and a role corresponding to the event element. The extraction model includes a classification layer and an output layer;

the classification layer is configured to determine a token attribute of a token in the object text; the token attribute includes whether the token is a start token of an event element of any event type and any role, and whether the token is an end token of an event element of any event type and any role; and the output layer is configured to determine an event element according to the token attribute of the token, and determine the event type and the role corresponding to the event element.

In an embodiment of the present disclosure, the object text (i.e., the text of the natural language to be subjected to event extraction) is processed by a preset extraction model to extract event information therein.

There may be various ways of acquiring the object text. For example, an object text stored in a specific storage medium (such as a hard disk) may be read, or the object text may be acquired through a net (a local area net or the internet).

The object text may come from various sources. For example, the object text may be a text within a certain range, such as a text in a newspaper or a magazine; alternatively, the object text may be a text collected from multiple sources by some means, such as a text obtained through a search engine (e.g., a text in a hot spot, texts searched within a specific time range, etc.), or a text crawled by web crawlers, etc.

The event information includes an event type of the event described in the object text, an event element involved in the event of the object text, and a correspondence relationship of the event element to a role thereof in the event type (i.e., what event type and what role the event element belongs to).

Figure 2:
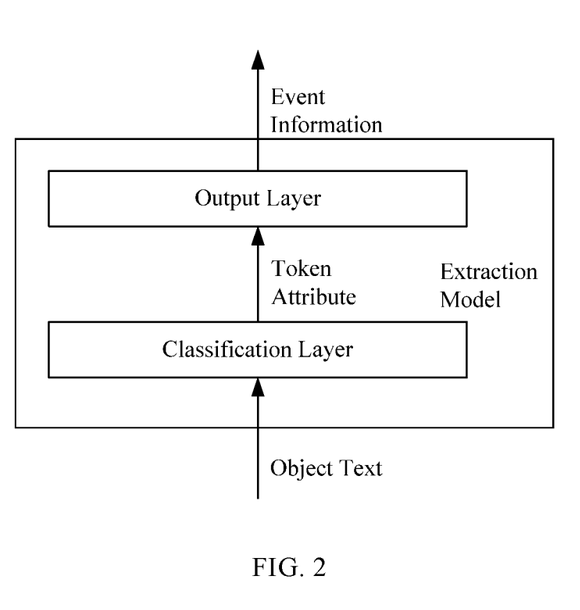
FIG. 2 is a block diagram of an extraction model used in the method for event extraction according to an embodiment of the present disclosure.

Referring to FIG. 2, the extraction model of the embodiment of the present disclosure includes a classification layer and an output layer.

The classification layer is configured to determine a token attribute of a token in the object text, whether a token is a start token (the first token) of an event element of respective event types and roles, and whether a token is an end token (last token) of an event element of respective event types and roles.

Thus, the classification layer determines both which tokens are "related" to respective roles of respective event types, and whether a token is the first or last token of the corresponding event element when the token is "related" to a role of an event type.

It can be seen that the classification layer actually corresponds to performing "multi-class" classification on the tokens, i.e., classifying a token into one or more possible classes, wherein each class may include a start token or end token of a particular event type and a particular role.

After the token attributes are obtained, the output layer determines, according to the token attribute of each token, which tokens in the object text correspond to event elements (i.e., correspond to at least one role of at least one event type), and the event type and role specifically corresponding to each event element, thereby completing the event extraction.

As can be seen, according to the embodiments of the present disclosure, the extraction model determines which tokens correspond to event elements, as well as the event type and role corresponding to each event element by directly determining the relationship between individual tokens and the event elements, the event types and the roles in the object text, thereby completing the event extraction. However, the above extraction process does not involve trigger word recognition at all, and does not perform the event recognition task or the role classification task, which is fundamentally different from the event recognition technology in the related art.

Therefore, no cascade error will be generated in the embodiments of the present disclosure, the extraction model is easy to train to an optimal state, and the event extraction effect is good.

Figure 4:
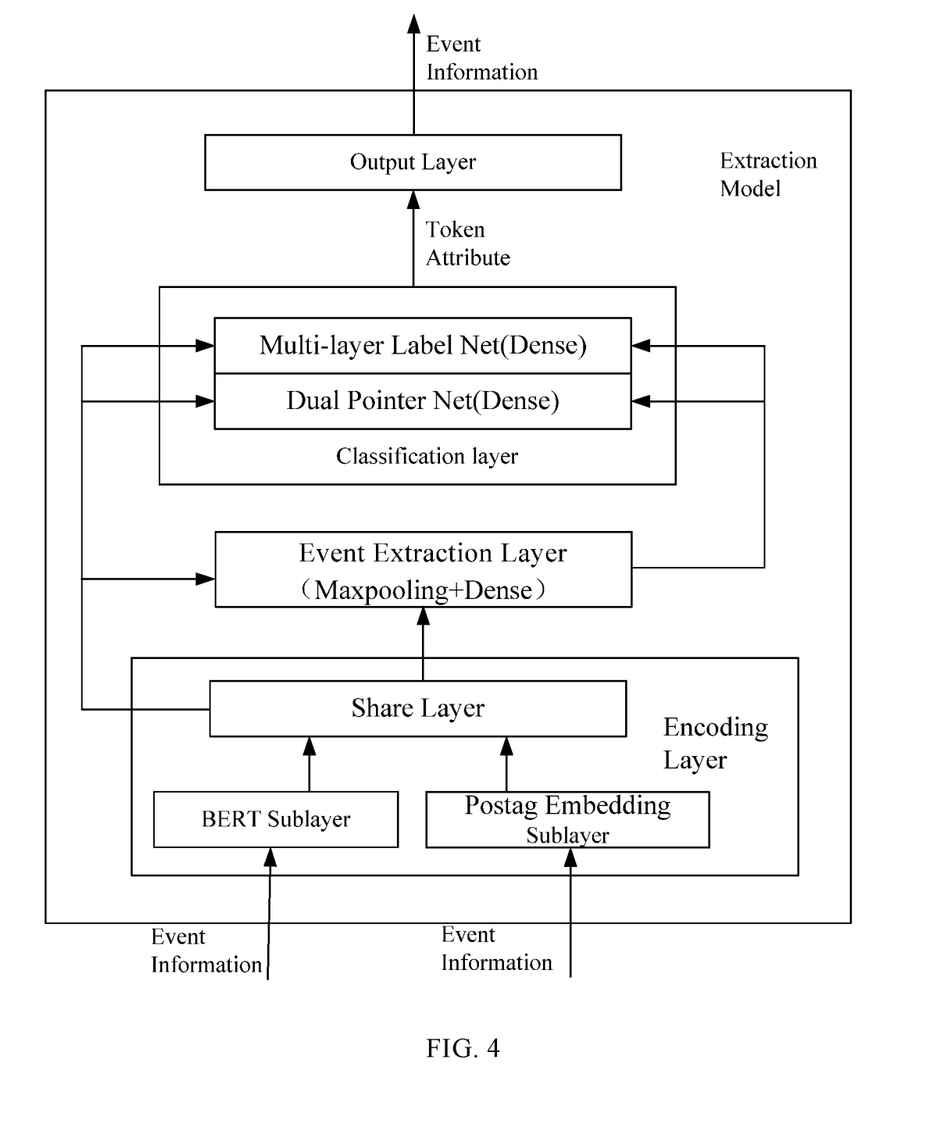
FIG. 4 is a block diagram of another extraction model used in the method for event extraction according to an embodiment of the present disclosure.

In some embodiments, the extraction model further includes an encoding layer; and the encoding layer is configured to encode the object text and input the encoded result to the classification layer.

Referring to FIG. 4, in order to better obtain semantic features of the object text, the extraction model can be further provided with an encoding layer that, after the object text is "encoded", inputs the codes to the classification net.

In some embodiments, the encoding layer includes a sub-layer of bidirectional encoder representation from transformer.

As an implementation of the embodiments of the present disclosure, the encoding layer includes a sub-layer of Bidirectional Encoder Representations from Transformers (BERT).

Thus, the extraction model in the embodiments of the present disclosure can be regarded as a "Multi-layer Label Pointer Net Based on BERT (BMPN)".

Exemplarily, the BERT sub-layer performs word segmentation on an input object text with a tokenizer to obtain a sequence X after word segmentation, which is then encoded into a token embedding matrix $W_t$ and a position embedding matrix $W_p$, and then the two matrixes (or vectors) are added to form an embedding expression vector $h_0$ that obtains an output text semantic expression vector $h_L$ through an L-layer transformer, where the corresponding process is represented as:

$$h_0 = XW_t + W_p;$$

$$h_i = \text{Transformer}(h_{i-1}), i \in [1, L]$$

where Transformer ( ) represents that the transformer performs a layer of processing on the content in the brackets; $h_i$ represents output of the $i^{th}$ layer of the transformer, so when i is not L, $h_i$ is output of a hidden layer of the transformer, and when i is L, $h_i$ is the text semantic expression vector $h_L$ herein, and is the final output of the transformer.

In view of the format, the BERT sub-layer may add a specific identifier (e.g., CLS) before the input text, and add a specific separator (e.g., SEP) to the text at the end.

In some embodiments, the encoding layer further includes a postag embedding sub-layer; and output of the postag embedding sub-layer and output of the bidirectional encoder representation from transforms sub-layer are concatenated into an encoded result.

Considering that the BERT sub-layer employs word coding, semantic information of some "words (a language structure composed of a plurality of subcomponents)" may be lost. Therefore, referring to FIG. 4, the encoding layer further includes a postag embedding sub-layer, where the postag embedding sub-layer performs postag embedding on the object text, and concatenates the obtained output result with the output result (text semantic expression vector $h_L$) of the BERT sub-layer into an output result of the encoding layer, that is, input of the classification net.

Exemplarily, a postag tool may be used to add a postag (e.g., verb, noun, adverb, etc.) to the input object text (e.g., Jieba), and then each word is embedded with a postag in a B-I-E manner based on the part of speech thereof, so as to obtain a postag embedding vector $h_{pos}$. The B-I-E tagging manner denotes the beginning of a word by B, the middle by I, the end by E, and individual tokens by S.

Then, the obtained postag embedding vector $h_{pos}$ is concatenated (for example, directly connected) with the text semantic expression vector $h_L$ output from the BERT sublayer, so as to obtain an output result of the encoding layer, specifically, a vector $h_s$ of a share layer, and the corresponding process is expressed as:

$$h_s = \text{Concatenate}([h_L, h_{pos}])$$

In some embodiments, the encoding layer further includes a sub-layer of bi-long short term memory, after passing which the output of the sub-layer of bidirectional encoder representation from transformer becomes the encoded result.

As another implementation of the embodiments of the present disclosure, a Bi-Long Short Term Memory (BIL-STM) sub-layer can be further added after the BERT sub-layer to extract long-term dependency information in the object text.

In some embodiments, the classification layer includes a start dichotomous-class net, an end dichotomous-class net, and a plurality of label dichotomous-class nets;

wherein the start dichotomous-class net is configured to determine whether a token in the object text is a start token of an event element; the end dichotomous-class net is configured to determine whether a token in the object text is an end token of an event element; each of the label dichotomous-class nets corresponds to a preset label and is configured to determine whether a token in the object text conforms to the preset label, wherein the preset label includes a preset event type and a preset role, and at least one of the preset event type and the preset role in the preset labels corresponding to any two different label dichotomous-class nets is different; and the process of determining an event element according to the token attribute of the token and determining the event type and the role corresponding to the event element includes: determining an event element according to the start token and the end token, determining a preset label corresponding to the event element according to preset labels of at least part of the tokens of the event element, and determining a preset event type and a preset role of the event element corresponding to the preset label.

It can be seen that the work of the classification layer can be logically divided into two parts; one is to determine whether a token is a start/end token of an event element, and the other is to determine a combination of the event type and the role corresponding to the token. By combining results of the two parts, the token attribute of the token can be determined.

To this end, the "multi-class" of the classification layer can specifically be realized by a plurality of "dichotomous-class", i.e. the classification layer can include a start dichotomous-class net, an end dichotomous-class net, and a plurality of label dichotomous-class nets.

The start dichotomous-class net only judges whether a token in the object text is a start token of an event element, while the end dichotomous-class net only judges whether a token in the object text is an end token of an event element. Thereby, the combined classification result of the two determines the start token and the end token of an event element in the object text.

Thereby, the start dichotomous-class net and the end dichotomous-class net as a whole can be regarded as a "dual pointer net", i.e., the dual pointer net is configured to give a head pointer (Start, corresponding to the start token) and a tail pointer (End, corresponding to the end token), respectively, and then the span of an event element, i.e., an event element, can be determined according to a head pointer and a tail pointer.

Figure 5:
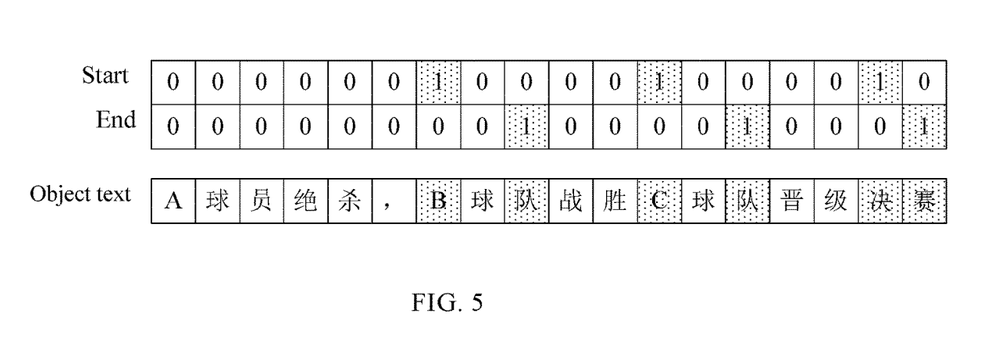
FIG. 5 is a schematic diagram of processing results of a dual pointer net in another extraction model used in the method for event extraction according to an embodiment of the present disclosure.

For example, for the processing result of the dual pointer net, reference can be made to FIG. 5, wherein in the Start row, 1 (filled with dots in FIG. 5) indicates that the token at the corresponding position (right below) is a start token, and 0 indicates that the token at the corresponding position is not a start token; while in the End row, 1 (filled with dots in FIG. 5) indicates that the token at the corresponding position is an end token, and 0 indicates that the token at the corresponding position is not an end token. In this manner, the start and end tokens in the object text are also determined (filled with dots in FIG. 5).

In the meanwhile, the classification layer further includes a plurality of label dichotomous-class nets, each of which is configured to determine whether a token belongs to tokens of an event element corresponding to a specific combination of event type and role, i.e., determine whether a token conforms to a preset label.

Moreover, the preset labels used in any two different label dichotomous-class nets for classification are different, i.e., for any two different preset labels, at least one of the preset event type and the preset role is different.

As a form of the embodiments of the present disclosure, all the preset labels corresponding to the label dichotomous-class nets should correspond to combinations of all possible (preset) event types and all possible (preset) roles one by one.

For example, if all possible event types and all possible roles are as shown in the table below, all the preset labels may include the following six: (competition behavior—win or lose, winner), (competition behavior—win or lose, loser), (competition behavior—win or lose, time), (competition behavior—promotion, time), (competition behavior—promotion, promoter), and (competition behavior—promotion, promotion match).

TABLE 1

Examples of event types and roles

| Event type | Role 1 | Role 2 | Role 3 |
|---|---|---|---|
| Competition behavior - win or lose | Winner | Loser | Time |
| Competition behavior - promotion | Time | Promoter | Promotion match |

Therefore, through the combination of the plurality of label dichotomous-class nets, the correspondence relationship of the tokens in the object text to the combinations of event types and roles is determined.

In that, different label dichotomous-class nets can be operated in a relatively independent manner such that for each token, it can be judged as conforming to only one preset label, or can be judged as conforming to multiple preset labels at the same time, or can be judged as not conforming to any preset label.

Thus, the plurality of label dichotomous-class nets essentially correspond to a "multi-layer label net" that determines token conformity in a plurality of preset labels.

Both the "dual pointer net" and the "multi-layer label net" can be logically implemented by a fully-connected layer, for example, by Dense. Therefore, each of them is represented by a Dense in FIG. 4.

Dense is a function representing a specific implementation form of the fully-connected layer, and is calculated by:

$$Out = Activation(W*a + bias);$$

where a, as an input to the function, is an n-dimensional vector; W is a preset weight in the form of an m*n dimensional vector; Activation represents an activation function; bias represents a preset bias; and Out, as an output of function, is an m-dimensional vector.

As can be seen, with the start dichotomous-class net and the end dichotomous-class net, it can determine which tokens in the object text belong to an "event element", while with the plurality of label dichotomous-class nets, it can determine to which preset labels (preset event types and preset roles) the tokens in the object text conform. Therefore, the output from the start dichotomous-class net, the output of the end dichotomous-class net and the output of the plurality of label dichotomous-class nets are combined, equivalent to determining whether each token is a start token of an event element of any event type and any role, and whether each tokens is an end token of an event element of any event type and any role, that is, determining the token attribute of each token and completing the work of the whole classification layer.

After the start token and the end token of an event element are determined, the output layer can determine that the tokens between the start token and the end token (including the start token and the end token) are tokens of the event element, thereby completing the process of determining the event element. Furthermore, according to the preset label to which the tokens of the event element conform, the output layer can also determine the preset label of the event element, that is, determine the combination of event type and role corresponding to the event element, so as to complete the event extraction.

It can be seen that the working process of the classification layer can be logically regarded as calculating the probability of each token conforming to the respective classes (each being a start token or an end token of a specific role of a specific event type), and then determining the class to which the token belongs according to the probability.

Exemplarily, it is predicted that the probability of the $i^{th}$ token being a start token of the preset label r is $p_i^{s\_r}$, and the probability of being an end token of the preset label r is $p_i^{e\_r}$, then a sum of $p_i^{s\_r}$ and $p_i^{e\_r}$ can be expressed as:

$$p_i^{s\_r}=\sigma(W_s^r x_i + b_s^r); \text{ and}$$

$$p_i^{e\_r}=\sigma(W_e^r x_i + b_e^r).$$

where s and e correspond to the start token and the end token, respectively, $w_s^r$ and $w_e^r$ are preset and trainable weight vectors corresponding to the combination r, respectively, $b_s^r$ and $b_e^r$ are preset and trainable bias items corresponding to the combination r, respectively, and σ is a sigmoid activation function.

Figure 3:
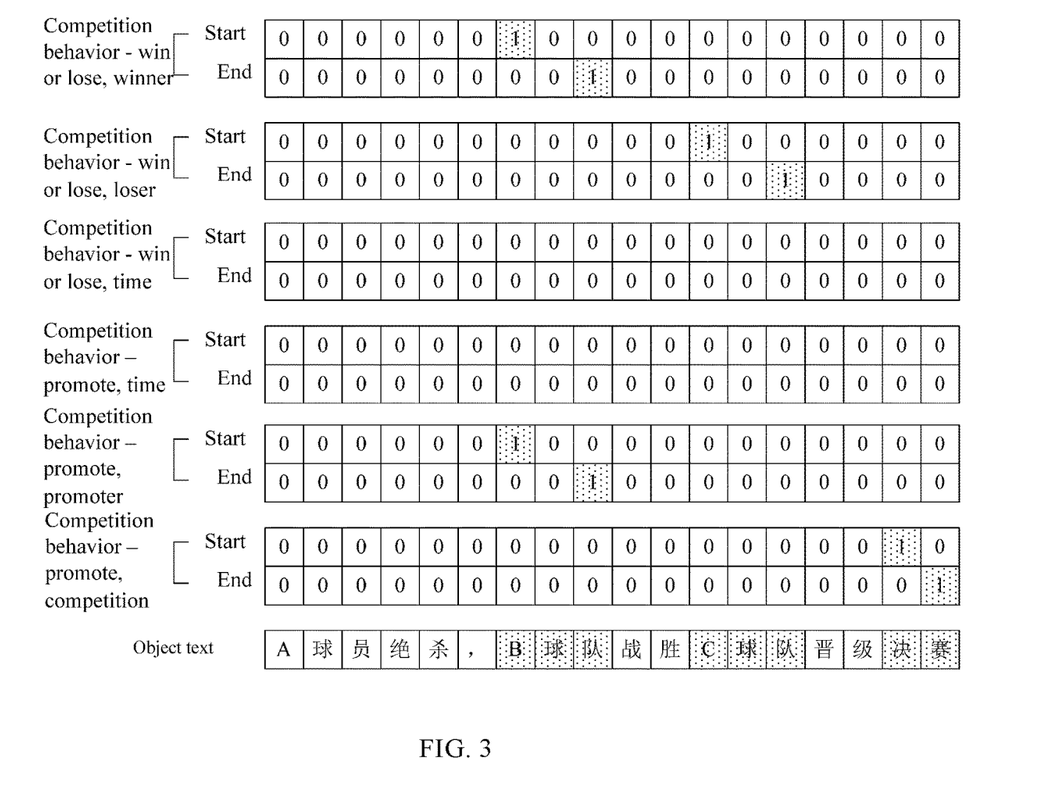
FIG. 3 is a schematic diagram of classification results of a classification layer of an extraction model used in the method for event extraction according to an embodiment of the present disclosure.

Thus, the overall classification result of the classification layer may be referred to FIG. 3. Each preset label, such as (competition behavior—win or lose, winner), corresponds to a row of labels (Start) representing start tokens and a row of labels (End) representing end tokens. In each row of labels, 1 (filled with dots in FIG. 3) indicates that the token at the corresponding position (right below) is a start token or an end token of an event element of a preset role of the preset label, while 0 indicates that the token at the corresponding position is not a start token or an end token of an event element of a preset role of the preset label. Thus, in the two rows of labels, tokens between two positions labeled with 1 are event elements of the preset role of the preset label (filled with dots in FIG. 3).

It should be understood that for some preset labels, both rows are labeled with 0, which means that the object text does not relate to any preset event type and/or preset role of the preset label.

Specifically, the overall classification result of the classification layer may be represented in the form of two two-dimensional matrices Ss and Se. Ss represents the correspondence relationship between the start token and the preset label, wherein each column is a token in an object text, and each row is a preset label, so that an intersection of a row and a column represents whether the token in the column is a start token of an event element of a preset role of the preset label in the row. Similarly, Se represents the correspondence relationship between the end token and the preset label, wherein each column is a token in an object text, and each row is a preset label, so that an intersection of a row and a column represents whether the token in the column is an end token of an event element of a preset role of the preset label in the row.

In some embodiments, the process of determining whether the token in the object text is a start token of an event element includes: determining whether each token in the object text is a start token of an event element one by one; and the process of determining whether the token in the object text is an end token of an event element includes: determining whether each token in the object text is an end token of an event element one by one.

As an implementation of the embodiments of the present disclosure, each token in the object text can be classified with a start dichotomous-class net and an end dichotomous-class net to determine whether the token is a start token or an end token of an event element, respectively.

It should be understood that the determination of the start token and the end token can be performed in other specific ways. For example, it is also possible to determine whether a subsequent token is an end token after the first start token in the object text is determined (because clearly no end token will appear before the first start token).

In some embodiments, the process of determining the event element according to the start token and the end token includes: determining a start token and an end token closest to each other as a group, and determining tokens between the start token and the end token of the same group as one event element.

Obviously, a plurality of event elements can be involved in the object text, resulting in a plurality of start tokens and a plurality of end tokens accordingly, and when these start tokens and end tokens are combined in different ways, it is equivalent to that the head pointer (Start) and the tail pointer (End) are combined in different ways, resulting in different spans of event elements, i.e. different event elements.

To ensure correctness of the obtained event element, a start token and an end token closest to each other can be determined as a "group", and the tokens between them (including the start token and the end token themselves) can be regarded as the tokens of the event element (referring to FIG. 3).

In some embodiments, the process of determining whether the token in the object text conforms to the preset label includes:

determining only whether each start token and each end token in the object text conform to the preset label.

As an implementation of the embodiments of the present disclosure, the start dichotomous-class net and the end dichotomous-class net can be first used to determine which tokens in the object text are start tokens or end tokens, and then the plurality of label dichotomous-class nets are used to perform classification according to the preset labels. Thereby, each label dichotomous-class net only needs to determine whether the start tokens and the end tokens conform to the preset labels without processing other tokens in the object text.

It should be understood that the label dichotomous-class net can determine the tokens in other specific ways. For example, each label dichotomous-class net may classify all the tokens in the object text.

In some embodiments, determining the preset label corresponding to the event element according to preset labels of at least part of the tokens of the event element includes: determining a preset label to which a start token and an end token of an event element both conform as the preset label of the event element.

The role of the event element is most related to the roles of the start token and the end token thereof. Therefore, when the start token and the end token have the same preset label, the output layer can regard the same preset label as the preset label of the event element, that is, it is determined that the event element corresponds to the preset event and the preset role in the preset label.

It should be understood that the determination of the preset label of the event element can be performed in other specific methods. For example, it is also possible that only when all tokens (including the intermediate tokens) of an event element have the same preset label, the preset label (the same preset label) is regarded as the preset label of the event element. Alternatively, it is also possible that when any token of an event element has a preset label, the preset label is regarded as the preset label of the event element.

In some embodiments, the extraction model further includes an event extraction layer; the event extraction layer is configured to determine a type probability of each event type; the type probability of the event type represents the correlation between the object text and the event type; and the process of determining the token attribute of the token in the object text includes:

determining an initial probability that the token in the object text is a start token of an event element of one event type and one role; and determining, according to the initial probability and a type probability of the event type, whether the token is the start token of the event element of the event type and the role;

determining an initial probability that the token in the object text is an end token of an event element of one event type and one role; and determining, according to the initial probability and the type probability of the event type, whether the token is an end token of the event element of the event type and the role.

As described above, the classification layer essentially classifies the "tokens" in the object text, so it obtains less information from the perspective of the "whole" object text. To this end, referring to FIG. 4, the extraction model may further include an event extraction layer configured to analyze the whole object text to determine a degree of correlation (type probability) of the whole object text (not individual tokens therein) with each event type.

Exemplarily, the event extraction layer can use a vector $h_s$ of a share layer as an input and perform maxpooling thereon, and then perform multi-class classification (each class corresponds to an event type) on the vector $h_s$ with a fully-connected layer (e.g., Dense), to determine the degree of correlation of the object text to each event type, i.e., the type probability $p^g$, the corresponding process being expressed as:

$$x_p = \text{Maxpooling}(h_s); \text{ and}$$

$$p^g = \sigma(W^g x_p + b^g)$$

where $W^g$ is a preset trainable weight vector, $b^g$ is a preset trainable bias term, $\sigma$ is a sigmoid activation function, and Maxpooling( ) represents maxpooling processing.

Accordingly, the classification layer first determines a probability (initial probability) of a token being the start token or the end token of the event element of a certain preset label through its own multi-class classification, and then judges whether the token conforms to the preset label according to the initial probability as well as the type probability of the same event type.

Exemplarily, the initial probability of a token corresponding to a preset label can be multiplied by the corresponding type probability. If the product of the two probabilities is greater than a preset value, it can be determined that the token conforms to the preset label; and if the product of the two is not greater than the preset value, the token is determined as not conforming to the preset label even if the initial probability is high.

Exemplarily, the above equation for a probability (final probability) $p_i^{s-r}$ of the $i^{th}$ token being predicted as the start token of the event element of the preset role of the preset label r, and a probability (final probability) $p_i^{e-r}$ of being the end token of the event element of the preset role of the preset label r may become:

$$p_i^{s-r} = p^{rg} \Box (\sigma(W_s^r x_i + b_s^r)); \text{ and}$$

$$p_i^{e-r} = p^{rg} \Box (\sigma(W_e^r x_i + b_e^r));$$

where $\sigma(W_s^r x_i + b_s^r)$ and $\sigma(W_e^r x_i + b_e^r)$ are equivalent to the above initial probabilities, and $p^{rg}$ represents the type probability $p^g$ of the event type corresponding to the preset label r.

Obviously, the specific manner of determining whether a token conforms to a preset label according to the initial probability and the final probability is various. For example, whether a token conforms to a preset label can be judged according to a sum value of the initial probability and the final probability; or only when the initial probability and the final probability are respectively greater than the preset value (which may be two different preset values), it is determined that the token conforms to the preset label.

Therefore, after providing the event extraction layer, it is equivalent to extracting information considering both the "tokens" and the "whole object text", which can increase the training convergence rate of the extraction model and improve the final event extraction effect to some extent.

In some embodiments, the process of determining the token attribute of the token in the object text includes:

independently determining, for each token in the object text, whether the token is a start token of an event element of any event type and any role, and whether the token is an end token of an event element of any event type and any role, respectively.

As an implementation of the embodiments of the present disclosure, it can be determined independently whether each token is a start token/an end token of an event element of a preset label, respectively (i.e., a combination of specific event type and specific role). In other words, the classification result of each token has no relation with that of other tokens.

In this manner, a case where one token corresponds to a plurality of preset labels may occur, so finally one event element can be determined to be a plurality of roles of a plurality of event types; or part of an event element forms another event element.

Therefore, the event with 'overlapped event element' or 'overlapped role' can be well processed in the embodiments of the present disclosure, and the effect of event extraction is further improved.

The process of determining the event type and the role corresponding to the event element includes:

determining, in response to the condition that a plurality of event elements correspond to the same event type and the same role and based on a confidence degree of each of the event elements corresponding to the event type and the role, that the event element with the highest confidence degree corresponds to the event type and the role.

Since the event extraction in the embodiments of the present disclosure is performed based on "tokens", a case where the same event type and the same role correspond to multiple different event elements may occur, wherein these different event elements are simultaneously "different expressions" for one "actual event element". This case may lead to a complex result of the event extraction. Therefore, in that case, the output layer can judge the confidence degree of each of the event elements conform to the event type and the role, respectively, and take the event element with the highest confidence degree as the event element corresponding to the event type and the role.

For example, for the object text "team H defeat defending champion team I", the original extraction result (Result) can include:

Result: {"event_type":"competition behavior—win or lose","argument": [{"role":"loser", "argument":"team I"}, {"role":"loser", "argument":"defending champion team I"}]";

where "event type" represents the event type, "argument" represents the event element, and "role" represents the role.

It can be seen that, due to different "modifiers", two corresponding event elements, "team I" and "defending champion team I", are generated for the "loser" role of the "competition behavior—win or lose" event type. At this time, the confidence degrees of the two event elements need to be determined. For example, taking the final probability corresponding to the start token of the event element as the confidence degree, it is determined that "team I" has a higher confidence degree than "defending champion team I". Therefore, the event element corresponding to the "loser" role of the "competition behavior—win or lose" event type is "team I" rather than "defending champion team I".

Obviously, the comparison process of the confidence degrees is optional. For example, when determining the token attribute corresponding to a token, the above problem will be avoided if it is stipulated that the token attribute can only be start token/end token of one role of one event type. Alternatively, it can be set that the same event type and the same role are allowed to correspond to a plurality of different event elements (regarded as different expressions of the same event element).

Figure 6:
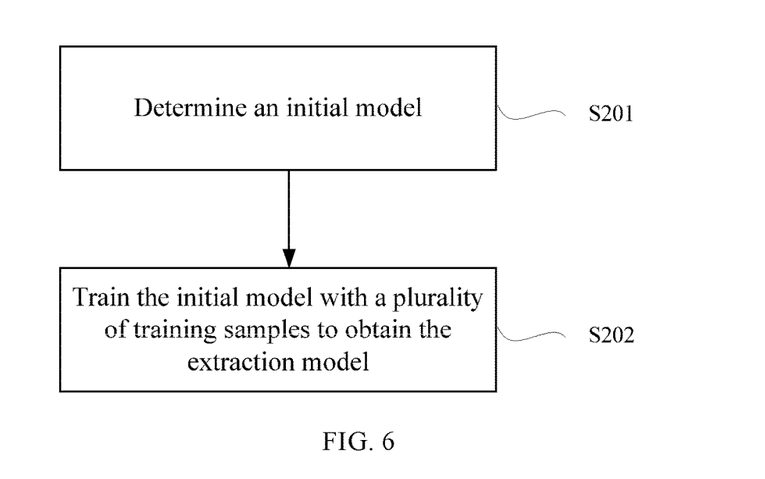
FIG. 6 is a flowchart of a method for extraction model training according to an embodiment of the present disclosure.

In a second aspect, referring to FIG. 6, an embodiment of the present disclosure provides a method for extraction model training, including the following steps S201 and S202.

At S201, an initial model is determined.

At S202, the initial model is trained with a plurality of training samples to obtain the extraction model.

The extraction model is configured to process an object text to determine event information of the object text; The event information includes an event element, and an event type and a role corresponding to the event element; the extraction model includes a classification layer and an output layer; the classification layer is configured to determine a token attribute of a token in the object text; the token attribute includes whether the token is a start token of an event element of any event type and any role, and whether the token is an end token of an event element of any event type and any role; and the output layer is configured to determine an event element according to the token attribute of the token, and determine the event type and the role corresponding to the event element.

The extraction model of the embodiment of the present disclosure can be obtained through training in advance, and the training process can include: setting an initial model and a training sample, wherein the initial model has the same structure as the extraction model, and the training sample includes an object text to be processed and a standard result (or a 'standard answer') obtained after the object text is processed; then, processing the training sample with the initial model, comparing the processed result with the standard result to determine a difference between the processed result and the standard result through a loss function, and adjusting parameters in the initial model according to the difference. These steps are repeated until a termination condition is met (e.g., the processed training samples reach a preset number, or the processing on the verified samples reaches a preset effect, or changes in the parameter converge, etc.), and then the initial model (parameters have changed) at this time is used as the extraction model.

For example, the loss function employed in the above training can be:

$$\text{loss} = -\sum_{i=1}^{n+2} y_i^{s\_r} \log(p_i^{s\_r}) - \sum_{j=1}^{n+2} y_j^{e\_r} \log(p_j^{e\_r});$$

where s and e correspond to the start token and the end token, respectively, n is a length (number of tokens) of the input object text, the sum symbol indicates a comprehensive judgment on the processed results of all tokens in the object text (an upper limit of the sum is "n+2", because the token sequence actually processed by the BERT sub-layer further includes the identifier CLS and the separator SEP described above), and thus, the two sum symbols correspond to the loss of the start token and the loss of the end token, respectively; and $y_i^{s\_r}$ and $y_i^{e\_r}$ represent judgment on whether a corresponding token in the standard result conforms to a preset label (0, not conformant; 1, conformant).

In some embodiments, the step of training the initial model with a plurality of training samples to obtain the extraction model includes:

performing adversarial training on the initial model with a plurality of training samples to obtain the extraction model.

As an implementation of the embodiments of the present disclosure, "adversarial training" can be adopted to improve the extraction effect of the obtained extraction model.

That is, part of the training samples are set as "adversarial samples" to which fine disturbances are intentionally added, and these disturbances are very likely to cause erroneous results in the extraction model. Through training with the confrontation samples, the model can adapt to disturbances, thereby improving the adversarial robustness of the extraction model obtained by the training.

For example, the adversarial training can be configured to add disturbances to the encoding layer, such as disturbing the token embedding matrix $W_t$ of the BERT sub-layer and the postag embedding vector $h_{pos}$ of the postag embedding sub-layer. Thus, the adversarial training may be represented as the following maximization and minimization equation:

$$\min_{\theta} E_{(x,y)\sim D}\left[\max_{\Delta x \in \Omega} L(x + \Delta x, y; \theta)\right];$$

where D represents a training set formed by all training samples, x represents input of the samples, y represents a preset label (standard result) of the samples, θ represents a model parameter, Δx represents the superimposed disturbance, and Ω represents a disturbance space for all disturbances.

Further, Δx can be calculated from a gradient of the embedding layer, which can be specifically expressed as:

$$\Delta x = \varepsilon\ \text{sign}[\nabla_x L(x,y;\theta)];$$

where $L(x,y;\theta)$ is a loss function of the sample, $\nabla_x L(x,y;\theta)$ represents that the loss function finds a gradient of x, ε is a preset constant, and thus, $L(x+\Delta x,y;\theta)$ represents a loss function obtained by superposing the disturbance Δx on the sample x (namely, a disturbance sample) and comparing the processed result with y.

Therefore, by directly disturbing the token embedding matrix $W_t$ of the encoding layer and the postag embedding vector $h_{pos}$ of the postag embedding sub-layer (namely adding disturbance Δx), the purpose of the adversarial training is achieved, and thus the extraction model adapts to the disturbance Δx and obtains better adversarial robustness.

Figure 7:
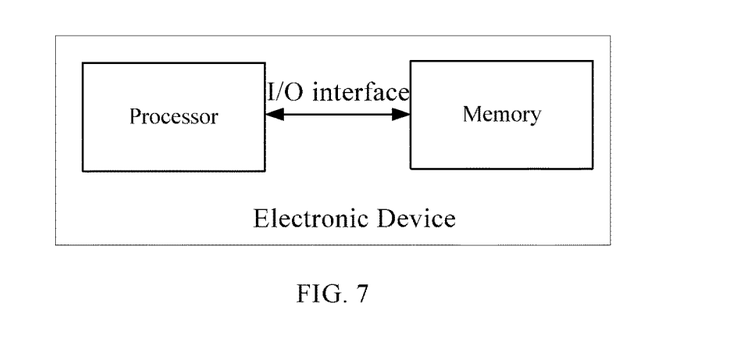
FIG. 7 is a block diagram showing components of an electronic device according to an embodiment of the present disclosure.

In a third aspect, referring to FIG. 7, an embodiment of the present disclosure provides an electronic device, including:
one or more processors;
a memory having one or more computer programs stored thereon;
one or more I/O interfaces connected between the processors and the memory and configured to enable information interaction between the processors and the memory; and
the one or more computer programs, when executed by the one or more processors, enable any one of the above methods for event extraction to be implemented.

Figure 8:
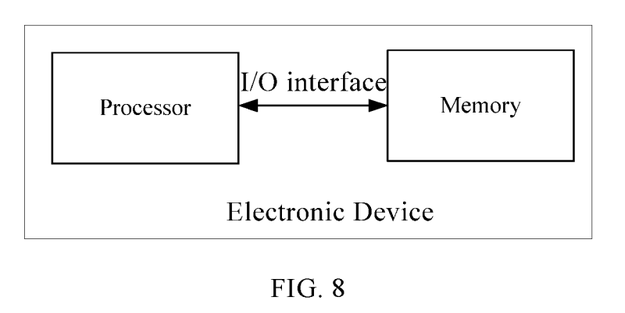
FIG. 8 is a block diagram showing components of another electronic device according to an embodiment of the present disclosure.

In a fourth aspect, referring to FIG. 8, an embodiment of the present disclosure provides an electronic device, including:
one or more processors;
a memory having one or more computer programs stored thereon:
one or more I/O interfaces connected between the processors and the memory and configured to enable information interaction between the processors and the memory; and
the one or more computer programs, when executed by the one or more processors, enable any one of the above methods for extraction model training to be implemented.

Figure 9:
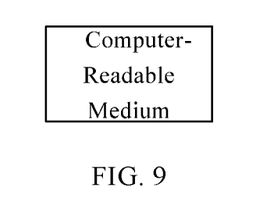
FIG. 9 is a block diagram showing components of a computer-readable medium according to an embodiment of the present disclosure.

In a fifth aspect, referring to FIG. 9, an embodiment of the present disclosure provides a computer-readable medium having a computer program stored thereon which, when executed by a processor, enables any one of the above methods for event extraction to be implemented.

Figure 10:
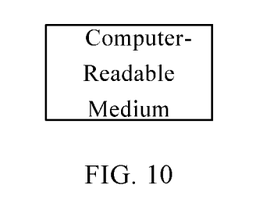
FIG. 10 is a block diagram showing components of another computer-readable medium according to an embodiment of the present disclosure.

In a sixth aspect, referring to FIG. 10, an embodiment of the present disclosure provides a computer-readable medium having a computer program stored thereon which, when executed by a processor, enables any one of the above methods for extraction model training to be implemented.

Specific Examples

Embodiments of the present disclosure are described in more detail below with reference to specific examples.
(1) Experimental Data
A preset Chinese event extraction data set is used as the experimental data. The data set includes 17,000 sentences (object text) obtained from hot spots of a specific search engine, wherein the standard results of event types, event elements and roles are determined by manual labeling. There are 65 preset event types (including recently added event types) in total, and accordingly it is determined that there are 20,000 events included in these sentences.

12,000 sentences in the data set are selected randomly as a training set, 1,500 sentences are selected randomly as a validation set, and the rest 3,500 sentences serve as a test set. 1,500 sentences are randomly selected from the test set as a first test set (test 1), while the 3,500 sentences in the test set as a whole are referred to as a second test set (test 2).
(2) Model Settings
The main extraction model (referred to as BMNP) in the embodiments of the present disclosure is provided with a BERT sub-layer, a postag embedding sub-layer, a start dichotomous-class net, an end dichotomous-class net, and a plurality of label dichotomous-class nets.

The main extraction model in which the postag embedding sub-layer is removed is taken as a first extraction model in the embodiments of the disclosure, called BMPN–POS.

The main extraction model with an added BILSTM sub-layer is taken as a second extraction model in the embodiments of the disclosure, called BMNP+BILSTM.

A third extraction model in the embodiments of the disclosure is obtained through adversarial training (i.e., other extraction models are not subjected to adversarial training), called BMNP+adversarial training.

The BERT sub-layer adopts a RoBERTA-Large pre-training language model, has a maximum sequence length of 160 tokens, and adopts Adam as an optimization algorithm. The initial learning rate is $5e^{-5}$, which is reduced to $1e^{-5}$ after one Epoch. There are 8 epochs in total, and the postag embedding dimension is 256.

A known extraction model having a "BERT+CRF (conditional random field)" structure in some related arts is taken as a comparative example extraction model, called BERT+CRF.

The above models are respectively trained to obtain the various extraction models in the embodiments and comparative examples of the disclosure.
(3) Experimental Results
The sentences in test 1 are processed by each extraction model, and produces the following processed results:

TABLE 2

Processed results of test 1 from each extraction model

| Model | Precision | Recall | F1 |
|---|---|---|---|
| BERT + CRF | 0.843 | 0.84 | 0.841 |
| BMPN-POS | 0.845 | 0.869 | 0.857 |
| BMPN | 0.847 | 0.872 | 0.859 |
| BMPN + BILSTM | 0.855 | 0.862 | 0.858 |
| BMPN + Adversarial Training | 0.851 | 0.871 | 0.861 |

Precision and recall are obtained by comparing the extraction result with the standard result, and F1 represents adopting token level match.

Token level match F1=2*token level match value P*token level match value R/(token level match value P+token level match value R);
    token level match value P=number of tokens shared by model prediction event elements and standard result event elements/number of tokens of model prediction event elements; and token level match value R=number of tokens shared by model prediction event elements and standard result event elements/number of tokens of standard result event elements.

It can be seen that the extraction models of the embodiments of the present disclosure are superior to the extraction models of the comparative examples in terms of precision and the token level match F1, and have even more prominent advantages in terms of recall.

The model extraction effect can be further improved by any one of adding a postag embedding sub-layer (referring to data comparison of BMPN and BMPN–POS), a BILSTM sub-layer or performing adversarial training, wherein adding a BILSTM sub-layer has the most prominent improvement in precision.

In order to sufficiently utilize the data set, the training set and the validation set are further combined together, and randomly disturbed and equally divided into 10 samples. Each extraction model in the embodiments of the disclosure is subjected to 10-fold cross validation (CV, i.e., 1 sample is selected from the 10 samples as a validation sample, while the remaining 9 samples are selected as training samples, and then different validation samples are selected and respectively trained) to obtain the extraction model. Then, the obtained results are subjected to voting ensembles (i.e., determining the standard result through voting according to the processed result of each extraction model), and then test 1 and test 2 are respectively processed, producing the following results:

TABLE 3

Processed results of test 1 from each extraction model (CV + voting ensembles)

| Model | Precision | Recall | F1 |
| --- | --- | --- | --- |
| BMPN-POS | 0.862 | 0.87 | 0.866 |
| BMPN | 0.862 | 0.872 | 0.867 |
| BMPN + BILSTM | 0.863 | 0.872 | 0.867 |
| BMPN + Adversarial Training | 0.86 | 0.876 | 0.868 |
| Ensemble all | 0.873 | 0.875 | 0.874 |

TABLE 4

Processed results of test 1 from each extraction model (CV + voting ensembles)

| Model | Precision | Recall | F1 |
| --- | --- | --- | --- |
| Ensemble all | 0.8758 | 0.8429 | 0.859 |

As mentioned above, different "expressions" can be given by different extraction models for "actual event elements" corresponding to a specific role of a specific event type, such as the above different expressions of "team I" and "defending champion team I". Then, these different "expressions" should be regarded as different results, and it is determined which "expression" (e.g., "team I") is correct according to voting of the extraction models It can be seen that the cross validation and the voting ensembles bring a certain improvement in the extraction effect, and the final result of the cross validation and the voting ensembles produces an F1 up to a value of 0.859 on test 2.

Those of ordinary skill in the art will appreciate that all or some steps of the above described method, functional modules/units in the system and apparatus can be implemented as software, firmware, hardware, and suitable combinations thereof.

In a hardware implementation, the division between the functional modules/units mentioned in the above description does not necessarily correspond to the division of physical components; for example, one physical component can have multiple functions, or one function or step may be performed cooperatively by several physical components.

Some or all physical components can be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. The computer storage medium includes, but is not limited to, a random access memory (RAM, more specifically SDRAM, DDR, etc.), a read only memory (ROM), an electrically erasable programmable read only memory (EEPROM), a flash memory (FLASH), or other disk storage; a compact disk read only memory (CD-ROM), a digital versatile disk (DVD), or other optical disk storages; a magnetic cassette, a magnetic tape, a magnetic disk storage or other magnetic storages; or any other media which can be used to store the desired information and accessed by a computer. Moreover, it is well known to those skilled in the art that communication medium typically includes a computer-readable instruction, a data structure, a program module, or other data in a modulated data signal, such as a carrier wave or other transport mechanism, and may include any information delivery medium.

The present disclosure has disclosed example embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or event elements described in connection with other embodiments, unless expressly stated otherwise, as would be apparent to one skilled in the art. It will, therefore, be understood by those skilled in the art that various changes in form and details may be made therein without departing from the scope of the disclosure as set forth in the appended claims.

The invention claimed is:

1. A method for event extraction, comprising:
processing an object text using a preset extraction model to determine event information of the object text,
wherein the event information comprises an event element, and an event type and a role corresponding to the event element; and the preset extraction model comprises a classification layer an output layer, and an event extraction layer, and the processing of the text using the presets extraction model, comprising:
determining a token attribute of a token in the object text by the classification layer, wherein the token attribute comprises whether the token is a start token of the event element, and whether the token is an end token of the event element;

determining the event element according to the token attribute of the token and determining the event type and the role corresponding to the event element, by the output layer; and determining a type probability of each event type by the event extraction layer, wherein the type probability of the event type represents a correlation between the object text and the event type, the determining of the token attribute of the token in the object text comprises:

determining an initial probability that the token in the object text is the start token of the event element of one event type and one role;

determining, according to the initial probability and the type probability of the event type, whether the token is the start token of the event element of the one event type and the one role;

determining an initial probability that the token in the object text is the end token of the event element of one other event type and one other role; and determining, according to the initial probability and the type probability of the event type, whether the token is the end token of the event element of the one other event type and the one other role.

2. The method according to claim 1, wherein the preset extraction model further comprises an encoding layer; and the encoding layer is configured to encode the object text and input an encoded result to the classification layer.

3. The method according to claim 2, wherein the encoding layer comprises a bidirectional encoder representation from transformer (BERT) sub-layer.

4. The method according to claim 3, wherein the encoding layer further comprises a postag embedding sub-layer; and an output of the postag embedding sub-layer and an output of the BERT sub-layer are concatenated into the encoded result.

5. The method according to claim 3, wherein the encoding layer further comprises a bi-long short term memory (BILSTM) sub-layer, after passing which an output of the BERT sub-layer becomes the encoded result.

6. The method according to claim 1, wherein the classification layer comprises a start dichotomous-class net, an end dichotomous-class net, and a plurality of label dichotomous-class nets;

wherein the start dichotomous-class net is configured to determine whether the token in the object text is the start token of the event element; the end dichotomous-class net is configured to determine whether the token in the object text is the end token of the event element; each of the label dichotomous-class nets corresponds to a preset label and is configured to determine whether the token in the object text conforms to the preset label, wherein the preset label comprises a preset event type and a preset role, and two preset labels corresponding to any two different label dichotomous-class nets are different from one another; and determining the event element according to the token attribute of the token and determining the event type and the role corresponding to the event element comprises: determining the event element according to the start token and the end token, determining the preset label corresponding to the event element according to the preset label of at least part of tokens of the event element, and determining the preset event type and the preset role of the preset label corresponding to the event element.

7. The method according to claim 6, wherein determining whether the token in the object text is the start token of the event element comprises: determining whether each token in the object text is the start token of the event element one by one; and determining whether the token in the object text is the end token of the event element comprises: determining whether each token in the object text is the end token of the event element one by one.

8. The method according to claim 7, wherein determining the event element according to the start token and the end token comprises: determining the start token and the end token closest to each other as a group, and determining the tokens between the start token and the end token in the same group as one event element.

9. The method according to claim 6, wherein determining whether the token in the object text conforms to the preset label comprises:

determining only whether each start token and each end token in the object text conform to the preset label.

10. The method according to claim 9, wherein determining the preset label corresponding to the event element according to the preset label of at least part of the tokens of the event element comprises:

determining the preset label to which both of the start token and the end token of the event element conform as the preset label of the event element.

11. The method according to claim 1, wherein determining the token attribute of the token in the object text comprises:

independently determining, for the token in the object text, whether the token is the start token of the event element, and whether the token is the end token of the event element, respectively.

12. The method according to claim 1, wherein determining the event type and the role corresponding to the event element comprises:

determining, in response to the condition that a plurality of event elements correspond to the same event type and the same role and based on a confidence degree of each of the event elements corresponding to the same event type and the same role, that one of the plurality of event elements with the highest confidence degree corresponds to the same event type and the same role.

13. An electronic device comprising:

one or more processor;

a memory having one or more computer program stored thereon; and one or more I/O interface connected between the one or more processor and the memory and configured to enable information interaction between the one or more processor and the memory; wherein the one or more computer program, when executed by the one or more processor, enables the method for event extraction according to claim 1 to be implemented.

14. A non-transitory computer-readable medium having a computer program stored thereon which, when executed by a processor, implement the method for event extraction according to claim 1.

15. A method for an extraction model, comprising:

determining an initial model;

training the initial model with a plurality of training samples to obtain the extraction model;

processing an object text to determine event information of the object text by using the extraction model, wherein the event information comprises an event element, and an event type and a role corresponding to the event element; and the extraction model comprises a classification layer, an output layer, and an event extraction layer, processing of the object text by using the preset extraction model, comprising:

determining a token attribute of a token in the object text by the classification layer, wherein the token attribute comprises whether the token is a start token of the event element, and whether the token is an end token of the event element;

determining the event element according to the token attribute of the token and determining the event type and the role corresponding to the event element, by the tout layer; and     determining a type probability of each event type by the event extraction layer, wherein the type probability of the event type represents a correlation between the object text and the event type, the determining of the token attribute of the token in the object text comprises:

determining an initial probability that the token in the object text is the start token of the event element of one event type and one role;

determining, according to the initial probability and the type probability of the event type, whether the token is the start token of the event element of the one event type and the one role;

determining an initial probability that the token in the object text is the end token of the event element of one other event type and one other role; and     determining, according to the initial probability and the type probability of the event type, whether the token is the end token of the event element of the one other event type and the one other role.

16. The method according to claim 15, wherein training the initial model with the plurality of training samples to obtain the extraction model comprises:

performing adversarial training on the initial model with the plurality of training samples to obtain the extraction model.

17. An electronic device, comprising:

one or more processor;

a memory having one or more computer program stored thereon:

one or more I/O interfaces connected between the processor and the memory and configured to enable information interaction between the processor and the memory; and     the one or more computer program, when executed by the one or more processor, enables the method for extraction model according to claim 15 to be implemented.

18. A non-transitory computer-readable medium having a computer program stored thereon which, when executed by a processor, implements the method for extraction model according to claim 15.

\* \* \* \* \*